United States Patent
Zhang et al.

(10) Patent No.: US 12,182,166 B1
(45) Date of Patent: *Dec. 31, 2024

(54) ASSET GATEWAY SERVICE WITH CLONING CAPABILITIES

(71) Applicant: Samsara Inc., San Francisco, CA (US)

(72) Inventors: Jennifer Zhang, San Francisco, CA (US); Wei Wu, San Francisco, CA (US); Christopher Mozzocchi, Denver, CO (US); Joanne Wang, Los Gatos, CA (US); Henry Qin, San Francisco, CA (US); Christopher Cunningham Frost, San Francisco, CA (US); Zach Dylag, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,148

(22) Filed: Aug. 31, 2023

Related U.S. Application Data

(63) Continuation of application No. 17/930,252, filed on Sep. 7, 2022, now Pat. No. 11,748,377.

(60) Provisional application No. 63/355,818, filed on Jun. 27, 2022.

(51) Int. Cl.
*G06F 16/00* (2019.01)
*G06F 16/27* (2019.01)

(52) U.S. Cl.
CPC .................... *G06F 16/273* (2019.01)

(58) Field of Classification Search
CPC ...................................... G06F 16/273
USPC .......................................... 707/613
See application file for complete search history.

(56) References Cited

U.S. PATENT DOCUMENTS 9,445,270 B1 * 9/2016 Bicket ................. H04W 4/80

* cited by examiner

*Primary Examiner* — Chelcie L Daye

(57) ABSTRACT

In various implementations, an asset gateway service receives log messages comprising asset data captured by a gateway device associated with an asset. The log messages each include a first identifier corresponding to a first representation of the gateway device, which itself is associated with a first organization. The service persists data from the log to a first datastore accessible by the first organization. The service also determines whether a second representation of the gateway device (i.e., a clone) exists. If so, the service persists at least some of the data from the log message to a second datastore, which itself may be associated with a second organization, thereby allowing both organizations to access the data in a secure yet convenient manner.

20 Claims, 9 Drawing Sheets

ASSET GATEWAY SERVICE WITH CLONING CAPABILITIES

CROSS REFERENCE TO RELATED APPLICATION

This application is a continuation of U.S. patent application Ser. No. 17/930,252 titled "Asset Gateway Service With Cloning Capabilities" filed on Sep. 7, 2022; which claims priority to and benefit from U.S. Provisional Patent Application No. 63/355,818 titled "Asset Gateway Service With Cloning Capabilities" filed on Jun. 27, 2022, each of which is expressly incorporated by reference herein.

TECHNICAL FIELD

Aspects of the disclosure are related to the field of computing and data management technology and, in particular, to asset gateway cloning capabilities.

BACKGROUND

Asset gateways provide organizations with the ability to monitor and manage their assets such as vehicles, airborne assets, industrial equipment, and the like. In a typical example, a gateway device connects to on-board systems of a vehicle or other such asset. The gateway device gathers data from the asset and continuously, periodically, or at some other interval uploads the data to an asset gateway service. An organization associated with the asset can login to the gateway service to view the system data in the context of a real-time dashboard or other such environment.

In many cases, a primary organization may own and/or operate a fleet of assets, at least some of which it provides to a secondary organization. For example, a company may own a fleet of trucks or other such vehicles that it leases to other companies or individuals. When doing so, both the primary organization and the secondary organization may desire the ability to login to and view their own respective dashboards, but for the same underlying assets. Unfortunately, privacy, scalability, and flexibility concerns have generally limited the feasibility and availability of such experiences.

In a brief example, a gateway attached to a vehicle gathers and reports data to an asset gateway service. The data is persisted in a datastore in association with an identifier (ID) or other such representation of the gateway, allowing both a primary organization and a second organization to access the data using the gateway ID. Access controls allow the data to be filtered on a per-organization basis in order to comply with customer preferences, regulatory requirements, and the like. However, such access controls can be cumbersome to implement and difficult to scale because the data is filtered on a per-request basis, based on the access granted to it for the organization making a request. Such an arrangement is not only difficult to implement but can also make the data vulnerable from a security and privacy standpoint since all of the data can be accessed by either party absent the correct controls.

Overview

Technology is disclosed herein that improves access to asset data provided by an asset gateway by virtue of multiple logical representations of the gateway (i.e., "clones"). In various implementations, an asset gateway service receives log messages comprising asset data captured by a gateway device associated with an asset. The log messages each include a first identifier corresponding to a first representation of the gateway device, which itself is associated with a first organization. The service persists data from the log to a first datastore accessible by the first organization. The service also determines whether a second representation of the gateway device (i.e., a clone) exists. If so, the service persists at least some of the data from the log message to a second datastore, which itself may be associated with a second organization, thereby allowing both organizations to access the data in a secure yet convenient manner.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several implementations are described in connection with these drawings, the disclosure is not limited to the implementations disclosed herein. On the contrary, the intent is to cover all alternatives, modification's, and equivalents.

DETAILED DESCRIPTION

Figure 1A:
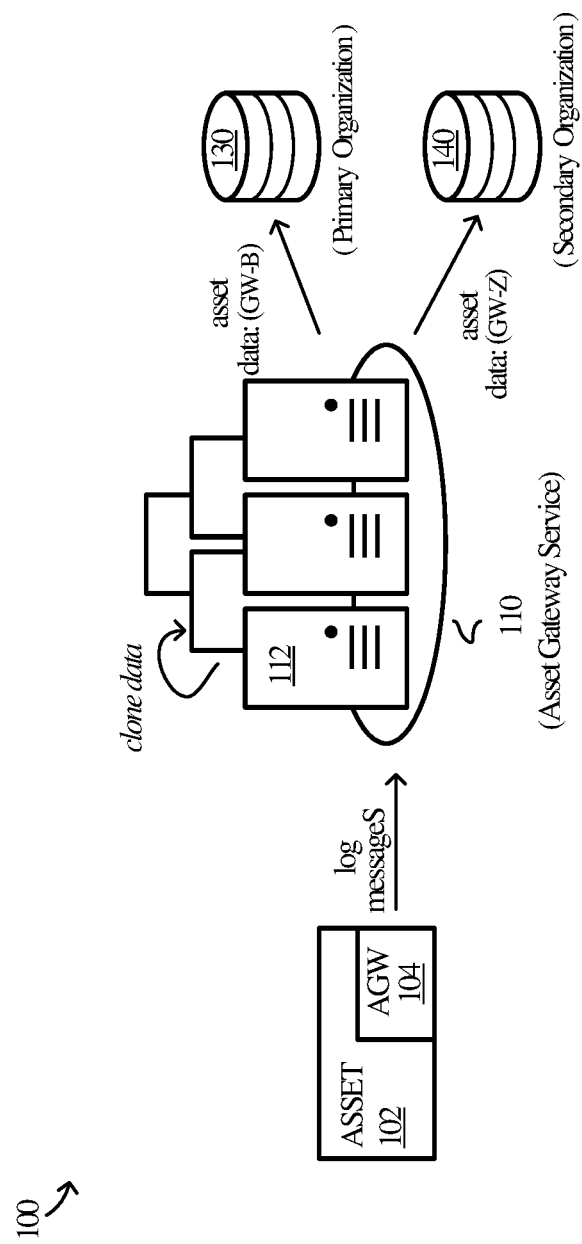
FIGS. 1A-1B illustrate an operational environment in an implementation.

Technology is proposed herein that improves access to gateway data through gateway "cloning" such that multiple organizations can access and experience the data produced by a single gateway as-if each organization had been provisioned with their own physical gateway device. Instead, the data supplied by a given gateway can be provided by an asset gateway service to one or more other organizations associated with the gateway, in addition to a main organization linked to the gateway, in a manner that is experienced by the secondary organizations as-if they had the primary relationship with the gateway.

In a brief example, a primary organization owns a physical asset that it leases to a secondary organization. The primary organization may be considered a source organization, since it owns the access gateway device connected to the asset and creates the "cloned" version of the gateway, to be linked to the secondary organization. The secondary organization may be considered a target organization, since they are the organization that ultimately activates the cloned gateway in a logical sense, even though the cloned gateway is not connected to the physical asset, but rather is only receiving cloned data.

The access gateway associated with the asset generates asset data that it communicates to an asset gateway service. The service persists some or all of the asset data to a datastore associated with and accessible by the primary organization. At the same time, the service is able to persist some or all of the data to a different datastore associated with and accessible by the secondary organization. Moreover, the data persisted to the second datastore is done so in association with a gateway identifier that differs relative to identifier with which the data is persisted in the first datastore. Such an arrangement allows the primary organization to access its own version of the asset data and under its own name or ID for the gateway, while the secondary organization is able to simultaneously access its own version of the data and under its or name or ID.

In one use-case, an insurance company has a vehicle fleet company as its customer. The insurance company desires to have access to asset data produced by gateways installed with the fleet vehicles. However, the insurance company does not want to see personal data or other proprietary business data. The asset gateway service as disclosed herein allows for the insurance company to be given access to one representation of the gateways, while the fleet company is provided with access to another representation of the gateways. In this case, the fleet that is being insured is the source organization since they own the vehicle. The insurance company is the target organization since they want a copy of their data so that they can use it for their risk models, assessments, and the like.

In another user-case, a rental company rents vehicles to a fleet owner. The rental company owns the vehicles and wants to know about any mechanical issues so they (the rental company) can ensure that a vehicle is properly maintained before it is damaged. The rental company may also want to provide access to a gateway dashboard view as a value-add to their rental service. The rental company normally would not want access to the personal data of the fleet drivers. Accordingly, the asset gateway service as disclosed herein allows for the rental company to be given access to one representation of the gateways, while the fleet company is provided with access to another representation of the gateways. In this case, the rental company is the source organization since they own the vehicles that they are renting out, while the fleet that is renting the vehicle is the target organization since they will be operating the vehicle and will need that data.

In both use-cases, the data provided to the various representations of the gateways could differ (even substantially) based on how an entity configures a representation of a gateway. In fact, gateway creation and configuration can be controlled by the primary organization associated with a given gateway device, so that the secondary organization to which the cloned gateway is assigned only receives the access granted to it by the primary organization. With that said, the situation could also be reversed, where the secondary organization is allowed to control the access given to the primary organization, even if the secondary organization neither owns the asset nor the asset gateway.

Such capabilities help to address privacy concerns, especially those driven by government regulations. For example, a gateway clone setup by one entity for the benefit of a second entity could be restricted from receiving personal identifiable information such as camera footage, tachograph downloads, trip assignments (driver names), and the like. In another example, a gateway clone setup by one entity for the benefit of a second entity could be restricted from receiving historical data older than a particular timeframe (such as data produced by a previous renter or between rentals).

In some implementations, the source organization may be given the ability in their dashboard experience to clone a gateway device as contemplated herein. In such scenarios, the setup process generates a unique code (serial number) that allows a target organization to activate the cloned gateway in their own dashboard, just as they would if they were setting up their own physical gateway. Instead, it is merely a representation of the existing gateway that is created in the target organization's dashboard. In some cases, the source organization may specify the target organization's ID when creating the clone. The source organization may also indicate an expiration date, after which cloned data ceases flowing to the target organization's representation of the gateway.

Figure 1B:
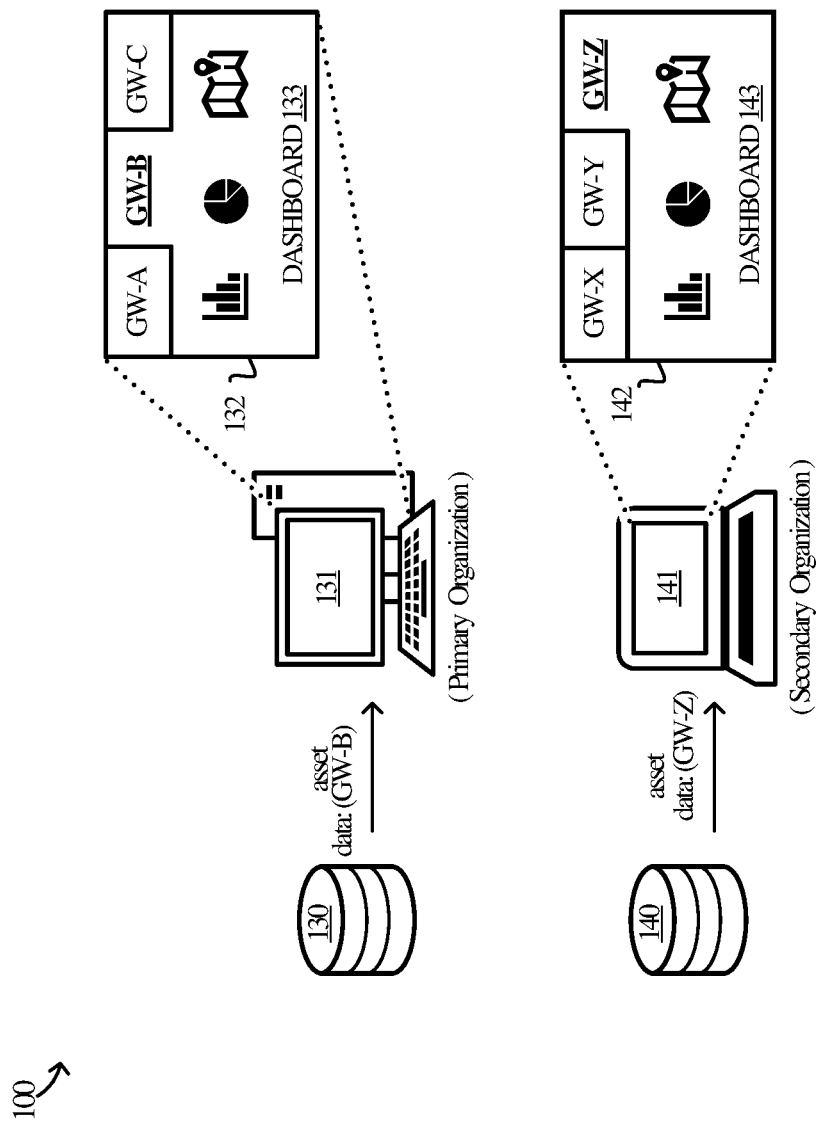

Referring now to the drawings, FIGS. 1A-1B illustrate operational environment 100 in an implementation. Referring first to FIG. 1A, operational environment 100 includes an asset 102, an asset gateway service (herein referred to as gateway service 110), datastore 130, and datastore 140. Asset 102 includes an asset gateway (AGW), herein referred to as gateway 104. In general, gateway service 110 obtains asset data from gateway 104, which gateway 104 has collected from asset 102. Gateway service 110 "clones" the data such that different versions of the data can be accessed by different downstream entities in their respective environments.

For example, referring to FIG. 1B, operational environment 100 further includes a computing device 131 associated with a primary organization, via which personnel associated with the primary organization can view, interact with, and otherwise experience their asset data persisted to datastore 130 (which is repeated in FIG. 1B for the sake of clarity). Operational environment 100 also includes a computing device 141 associated with a secondary organization, via which personnel associated with the secondary organization can view, interact with, and otherwise experience their asset data persisted to datastore 140 (which is also repeated in FIG. 1B for the sake of clarity).

Figure 7:
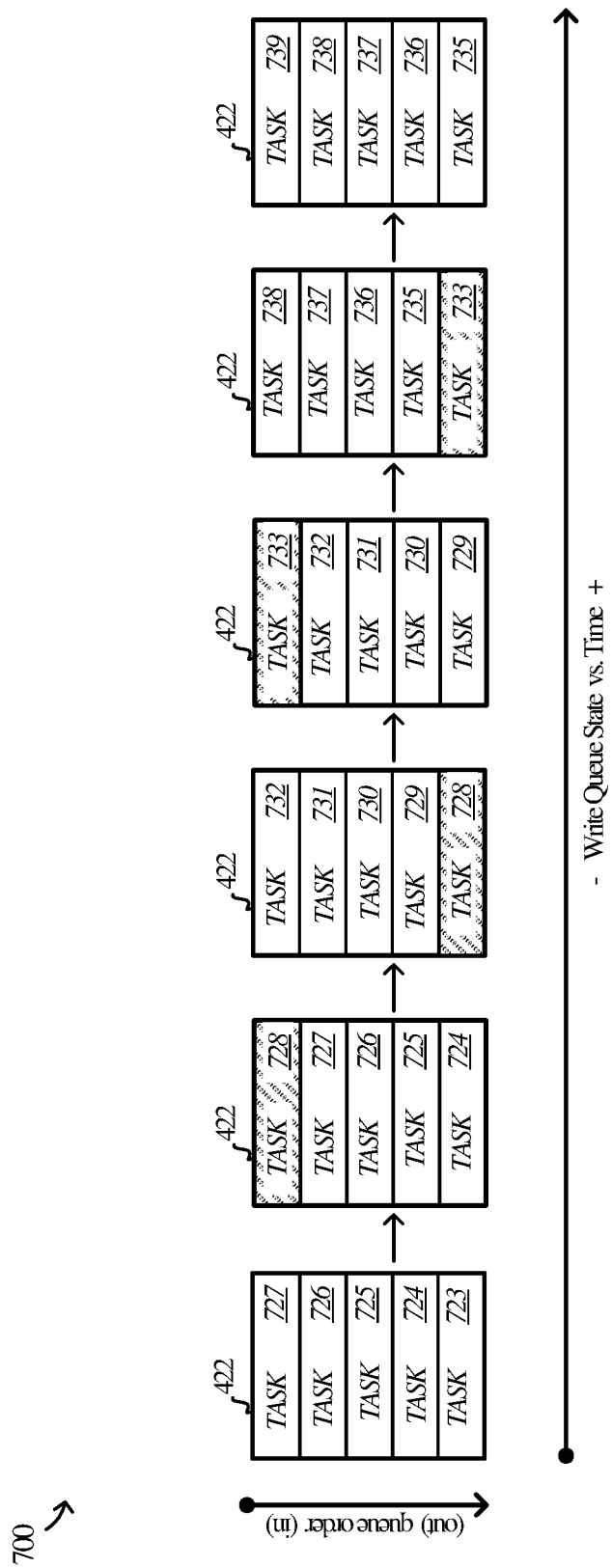
FIG. 7 illustrates a visualization of a queue in an implementation.

The features and functionality provided by gateway service 110 in the context of operational environment 100 allow its customers to track various aspects of their assets and operations. Examples of such assets include, but are not limited to, automotive assets (cars, trucks, etc.), shipping assets (railcars, container ships, etc.), airborne assets, construction and/or industrial assets, agricultural assets, and the like. Gateway service 110 is representative of any service capable of interfacing with gateways to obtain asset data and providing the asset data to customers or other such entities. Gateway service 110 is implemented on one or more server computers 112, of which computing device 700 in FIG. 7 is representative, and usually in the context of one or more data centers that include other equipment such as switches, routers, and storage devices that function together to provide gateway service 110. Gateway service 110 may be hosted "in the cloud," whether it be an on-premises cloud, a third-party cloud, or a hybrid cloud distributed between on-prem and off-prem clouds.

Gateway 104 interfaces with various elements of asset 102 to obtain the data that it reports to gateway service 110.

Examples of asset data provided by gateway 104 include global positioning system (GPS) location data, engine diagnostics, fuel efficiency data, image data, video data, vehicle analytics data, operator data, workflow data, and the like. Gateway service 110 employs a cloning process, of which cloning process 200 in FIG. 2 is representative, to the clone the data (when applicable) for storage and presentation in association the various representations of gateway 104 that might exist.

Figure 2:
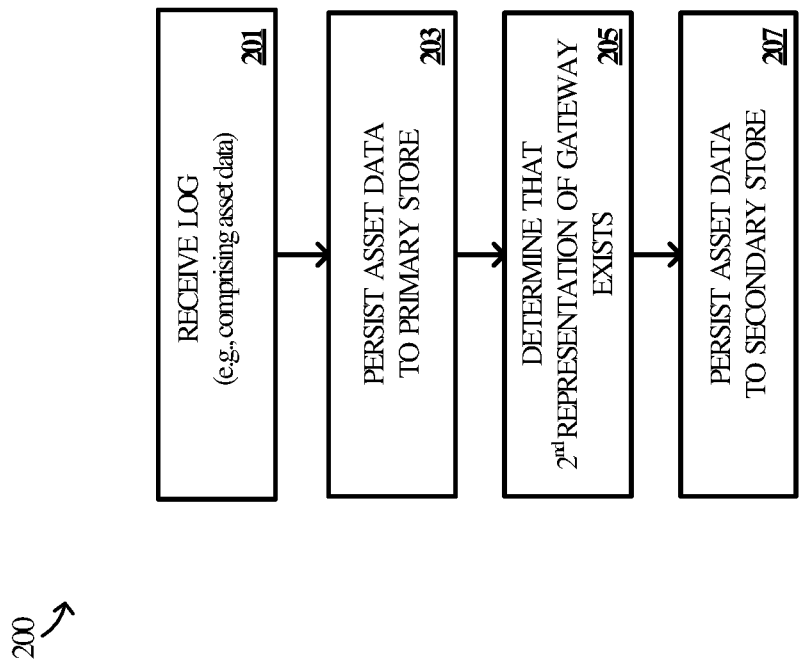
FIG. 2 illustrates a cloning process in an implementation.

Referring to FIG. 2, cloning process 200 may be implemented in program instructions in the context of any of the software applications, modules, components, or other such elements of a suitable operations service, such as gateway service 110. The program instructions direct the computing systems that provide the service to operate as follows, referring parenthetically to the steps of FIG. 2 and in the singular for the sake of clarity.

In operation, a representative computing system receives a log message that includes asset data captured by a gateway device onboard an asset (step 201). The log message also includes a first identifier, which corresponds to a first representation of the gateway device and is associated with a first organization. The computing system persists at least a portion of the asset data in a primary datastore accessible by the first organization and in association with the first representation of the gateway device (step 203). That is, the data is persisted to the primary datastore such that it can be accessed by the first organization in association with the first representation of the gateway.

Next, the computing system determines that at least a second representation of the gateway device associated with a second organization exists (step 205). This may be accomplished by, for example, determining whether cloning is enabled for either the gateway or the first representation of the gateway. In other scenarios, the determination is made by searching for other representations of the gateway. In any case, once the determination has been made, the computing system proceeds to persist at least a second portion of the asset to a secondary datastore accessible by a second organization (step 207). In addition, the data is persisted in association with a second identifier that corresponds to the second representation of the gateway.

Figure 3:
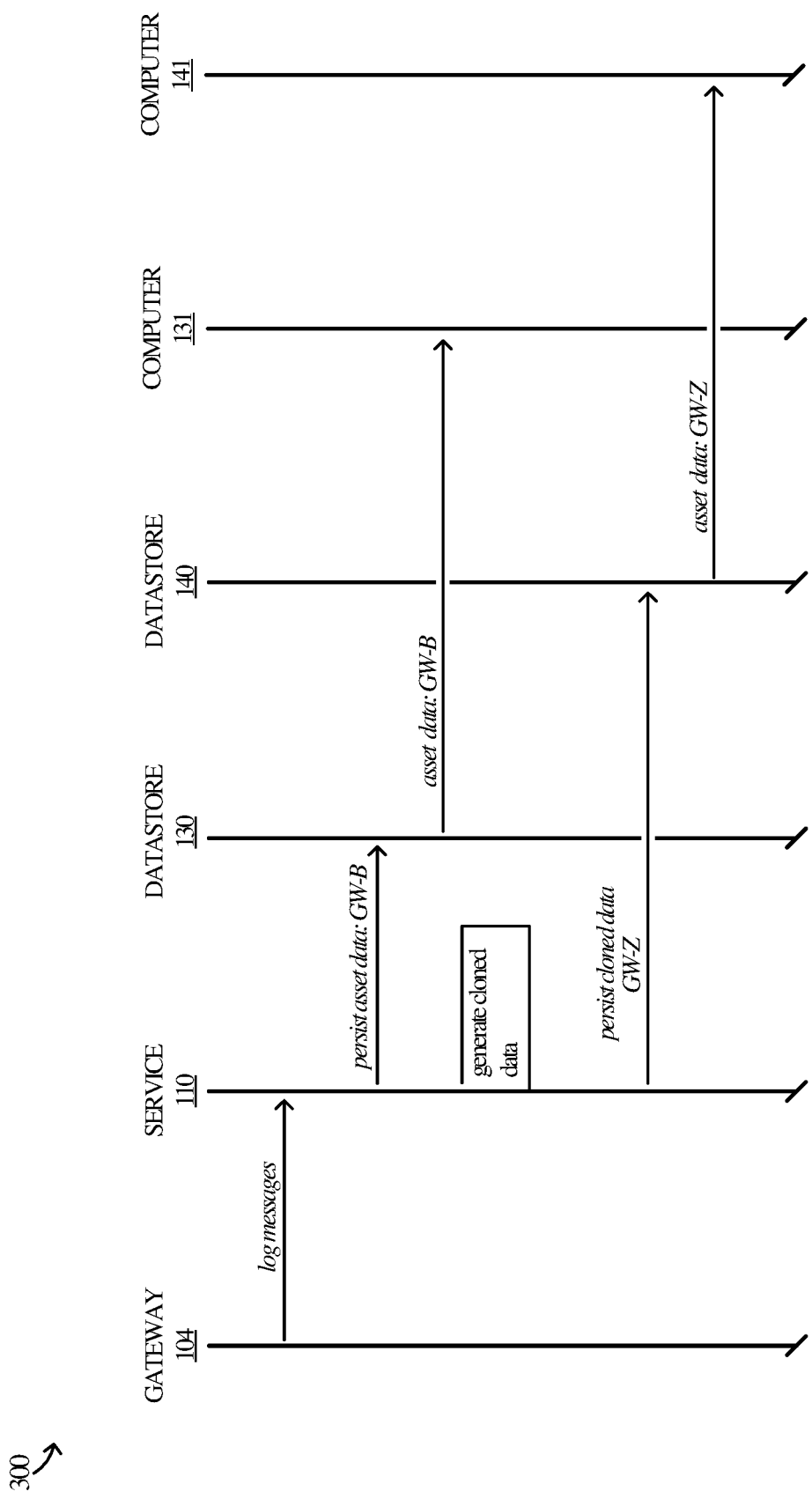
FIG. 3 illustrates an operational scenario in an implementation.

Referring to FIG. 3, an operational scenario is illustrated whereby gateway service 110 employs cloning process 200 to provide different gateway experiences to different entities but based on the same asset data sourced from the same gateway. In operation, gateway 104 generates a log message comprising asset data of asset 102 (e.g., vehicle operations data, diver and/or operator data, etc.). The log message may also include an identifier for an organization (e.g., the organization that owns asset 102 and/or gateway 104).

Gateway 104 transmits the log message to gateway service 110. In some examples, gateway service 110 utilizes an application programming interface (API) to communicate with gateway 104. Gateway service 110 may submit individual queries via the API to gateway 104 to obtain individual log messages, or the log messages may be obtained or otherwise delivered in-bulk. Alternatively, gateway 104 may initiate the transfer of log messages to gateway service 110, either individually or in-bulk.

Gateway service 110 receives the log message, which includes both asset data and an identifier corresponding to a first representation of gateway 104. Here, it is assumed for exemplary purposes that the first representation of gateway 104 is labeled gateway B. Thus, the log message includes not only asset data associated with asset 102, but also an identify "B" for gateway 104. Gateway service 110 persists the asset data to datastore 130, which represents a repository for storing data one or more of tables, records, databases, files, or the like.

It may also be appreciated that datastore 130 is accessible by a first organization that has a primary relationship to gateway 104. For example, the first organization may own or lease the gateway device. The first organization can view the asset data in various environments, of which environment 132 is representative. Environment 132 includes, for example, a dashboard view 133 produced by an application on computing device 131 that provides the organization with access to asset data gathered by its various gateways. In this example, environment 132 provides the organization with access to data provided by three physical gateways represented by gateway A, gateway B, and gateway C. Thus, at least a portion of the asset data reported in the log message by gateway 104 is reported in dashboard view 133, in association with gateway B.

However, it is further assumed for exemplary purposes that cloning has been enabled with respect to gateway 104 and/or gateway B (which is a logical representation of gateway 104). As such, gateway service 110 "clones" the asset data and persists it to a different datastore associated with a different representation of the gateway, which itself may be considered or otherwise referred to as a clone. Here, the asset data is persisted to datastore 140, which is a datastore accessible by a different organization that differs from the first organization. In some scenarios, the second organization may be considered a "secondary" organization, such as one that rents, leases, or otherwise obtains use of gateway 104 from the primary organization in a subsidiary manner. However, the use of gateway 104 is done in such a way that an entirely different representation gateway 104 is created in gateway service 110, allowing the second organization to view the asset data produced by gateway 104 as-if the secondary organization were directly associated with the physical gateway. This is accomplished by gateway service 110 persisting at least some of the asset data not only to a different datastore (datastore 140), but in association with a name or other such representation for the gateway. Here, the asset data is persisted to datastore 140 in association with gateway Z, which is a representation of gateway 104 associated with the secondary organization.

The second organization can view the asset data in various environments, of which environment 142 is representative. Environment 142 includes, for example, a dashboard view 20 produced by an application on computing device 141 that provides the secondary organization with access to asset data gathered by its various gateways. In this example, environment 142 provides the secondary organization with access to data provided by three physical gateways represented by gateway X, gateway Y, and gateway Z. Thus, at least a portion of the asset data reported in the log message by gateway 104 is reported in a dashboard for gateway Z presented in environment 142. In other words, the asset data produced by gateway 104 is not only persisted twice to two different datastores, but is also represented twice—once as data produced by "gateway B," and a second time as data produced by "gateway Z."

Figure 4:
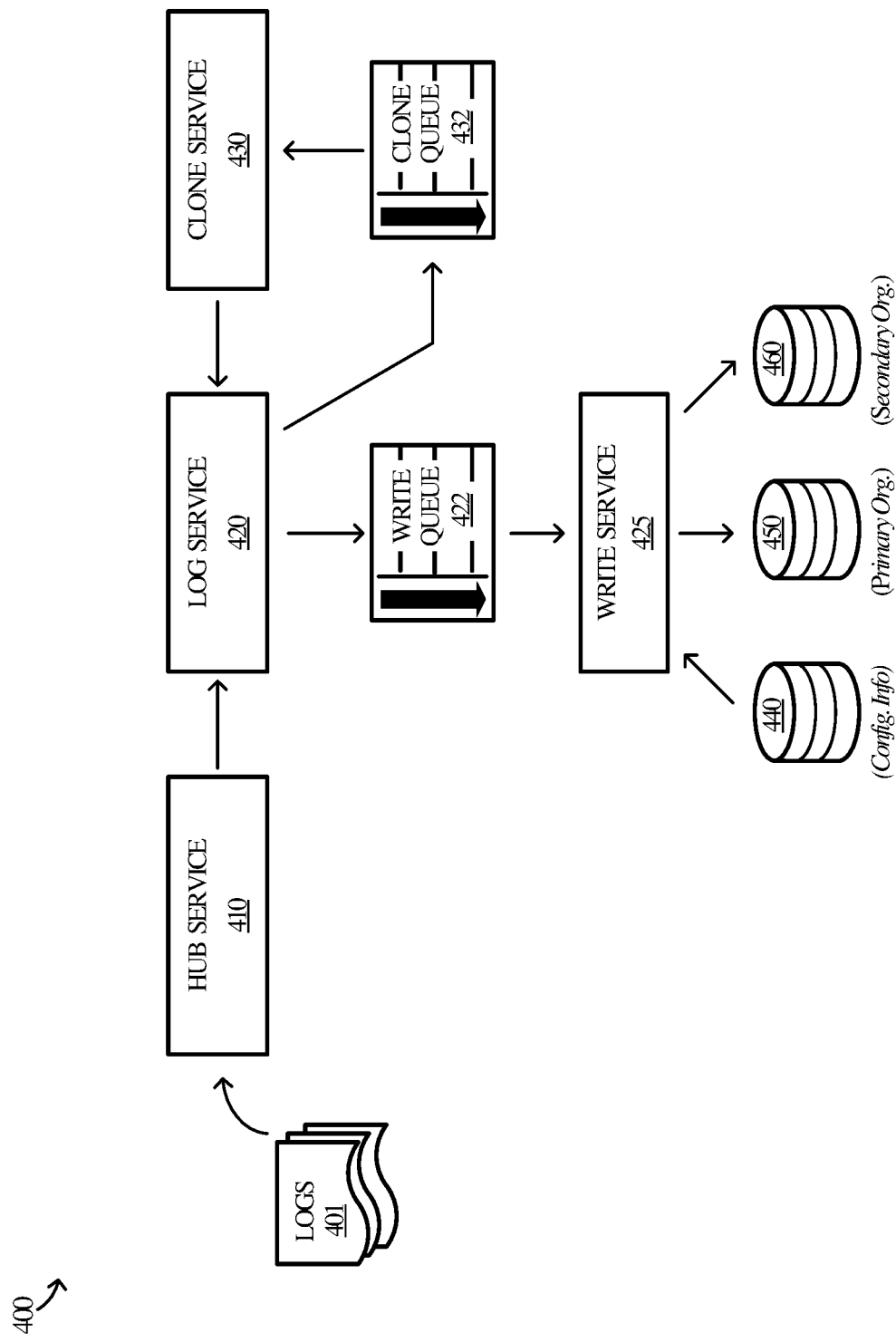
FIG. 4 illustrates a service architecture in an implementation.

FIG. 4 illustrates a service architecture 400 in an implementation that is representative of a collection of applications, services, micro-services, and/or other elements to provide an access gateway service as proposed herein. Service architecture 400 includes a hub service 410, a log service 420, a clone service 430, and a write service 425 each of which may be implemented as micro-services, applications, containers, or any variation or combination thereof.

Hub service 410 is capable of receiving log messages 401 generated by asset gateway deployed in the field in conjunction with physical assets. Log service 420 is operationally coupled hub service 410, write queue 422, and clone service 430, while clone service 420 is also coupled with clone queue 432. Write service 425 is operationally coupled with write queue 422, datastore 440, datastore 450, and datastore 460. The elements of service architecture 400 may be implemented in the context of a data center and by one or more computing devices, of which computing device 700 is representative.

In operation, hub service 410 takes-in the log messages and forwards them to log service 420. Log service 420 examines each message and places each respective message in write queue 422. Write queue 422 provides a queue for write tasks to be completed by write service 425. As write service 425 completes the tasks (by writing asset data to an appropriate datastore), the task is removed from the queue.

Log service 420 also determines whether a given log message qualifies for cloning. If so, log service 420 submits the log to clone queue 432. Clone queue 432 provides a queue for cloning tasks to be completed by clone service 430. Clone service 430 clones a given log message and provides the cloned log to log service 420, to be submitted to write queue 422. In essence, an original log message is supplied twice to write queue 422—first in its original form, and the second time in its cloned form. However, the cloned version differs from the original version in that it belongs to a different organization and a different representation of the gateway that produced the log. This is accomplished by clone service 430 changing or otherwise specifying a different gateway identifier for the log message which, in turn, drives a differentiated treatment of the asset data contained in the log message by write service 425, even though the asset data itself is the same.

Figure 5:
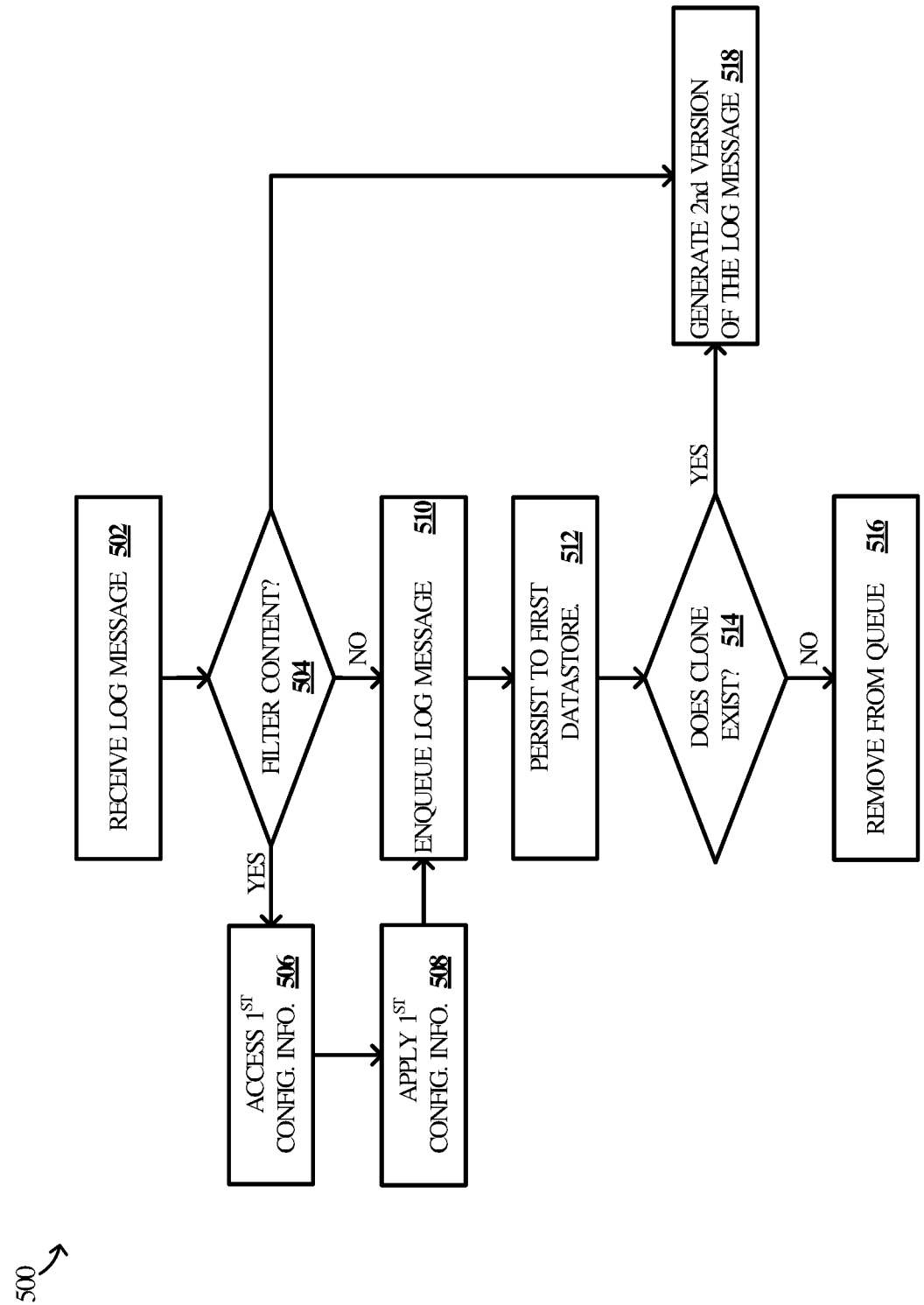
FIG. 5 illustrates another cloning process in an implementation.

FIG. 5 illustrates a cloning process 500, which is representative of a process employed by the elements of service architecture 400 to clone a gateway experience as proposed herein. Cloning process 500 may be implemented in program instructions in the context of any of the software applications, modules, components, or other such elements deployed by the various elements of service architecture 400. The program instructions direct the underlying physical and/or virtual computing system or systems to operate as follows, referring parenthetically to the steps of FIG. 5, and referring to a gateway service for the sake of clarity.

In operation, the gateway service receives a log message (step 502) and determines whether the content of the log message should be filtered (step 504). In response and/or subsequent to determining that the content should be filtered, the gateway service accesses configuration information stored in a configuration datastore to identify the correct filter (step 506). Next, the service applies the configuration information to the asset data in the log message to create a filtered log message (step 508). The filtered log message is then enqueued to be written to a customer datastore (step 510). (In response to and/or subsequent to determining that the content should not be filtered, the log message would otherwise have been enqueued immediately, without filtering any of the asset data.)

One the log message has been submitted to the write-queue, it is persisted to a datastore associated with one organization (step 512). At this point (or beforehand), the service determines whether a cloned representation of the gateway exists (step 514). If not, the message is removed from the queue—since it has been persisted to storage—and the process ends (step 516). However, if a gateway clone does exist, then the process proceeds to generate a second version of the log message (step 518). The second version of the log message will differ from the first version in that the identified gateway will be different, as will the organization with which it is associated, while some of the data may also differ. The second version of the log message is enqueued in the same write queue to be persisted to an appropriate datastore associated with the clone representation of gateway.

Figure 6:
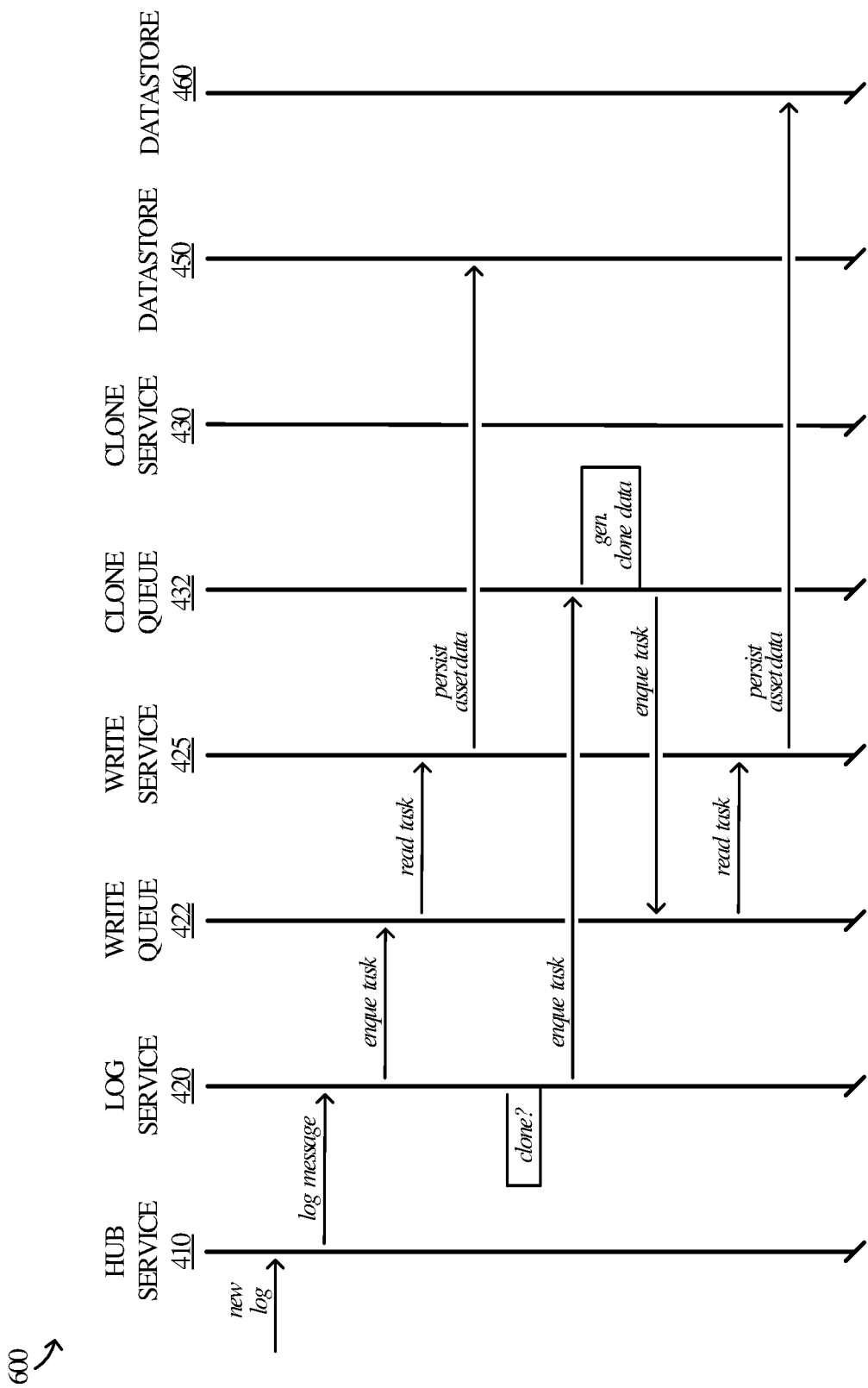
FIG. 6 illustrates another operational scenario in an implementation.

FIG. 6 illustrates an operational sequence 600, which is representative of an application of cloning process 500 by the elements of service architecture 500 in FIG. 5. In operational sequence 600, hub service 410 receives a new log message from an asset gateway device and supplies the message to log service 420. Log service 420 determines whether to filter any of the content of the log message (e.g., based on the configuration information). Next, log service 420 enqueues the log message in its filtered or unfiltered form in write queue 422.

Write service 425 sees the new task in write queue 422 and proceeds to persist the asset data from the message to its appropriate datastore. Write service 425 may determine the appropriate datastore in a number of ways. For example, the log message may identify a name or identifier (representation) of the gateway. From there, write service 425 can ascertain an identify of a datastore associated with or otherwise corresponding to the gateway identifier. Alternatively (or in addition), the log message could include organizational information that identifies an entity associated with the gateway representation. From there, write service 425 could ascertain the identity of the datastore associated with the associated entity. In still another example, the enqueued task could include information pointing to or otherwise indicative of the appropriate datastore.

Write service 425 proceeds to persist some or all of the asset data to datastore 450. Which specific pieces of data are written may be governed by the enqueued task, such that the task itself would include information indicative of the data to be stored. Alternatively, write service 425 could access configuration information in datastore 440 to ascertain which portions of the asset data to persist to datastore 450.

Next, log service 420 determines whether a cloned representation of the gateway exists. Alternatively, write service 425 (or some other service) could make the determination of whether a cloned representation exists. In some cases, this is accomplished by checking a profile associated with the physical gateway and/or a profile of the main representation of the gateway to determine whether cloning is enabled for the gateway. While illustrated as occurring subsequent the asset data being persisted to datastore 450, it may be appreciated that a cloning determination could be made before, during, or after persisting the data.

It is assumed here that a cloned representation does exist, and so a new task is placed in clone queue 432 to create a new version of the log message. It is assumed here that log service 420 submits the new task to clone queue 432, although write service 425 or some other service could also be capable of enqueuing the new task. Clone service 430 sees the new task in clone queue 432 proceeds to generate a new version of the original message, which may be considered a "clone" of the original message. However, the new message differs in at least one respect: it is associated with the second or "cloned" representation of the gateway.

Having generated the new log message, clone service 430 sends the new log message to log service 420. Log service 420 receives the new log message from clone service 430 as-if it has received it from hub service 410. Alternatively, clone service 430 could supply the new log message to hub service 410. In either case, log service 420 receives the new message and places it in write queue 422.

Write service 425 again sees a new task in write queue 422 and proceeds to persist the asset data from the message to its appropriate datastore. Here, it is assumed that the new version of the log message is associated with a different entity than the first message. As such, new version of the message resolves to a different datastore than the first message—datastore 460. Accordingly, write service 425 persists the new version of the log message to datastore 460 so that it can be accessed by the appropriate entity associated with the cloned representation of the gateway.

FIG. 7 illustrates a visualization 700 of the contents of write queue 422 and how they might change over time in view of the scenario described above with respect to FIG. 6. To begin, write queue 422 includes five tasks 723-727. The tasks are executed in the order in which they are received in and move through the queue, which here is depicted as top to bottom. That is, tasks enter the queue from the top, and are taken off the queue from the bottom, once they are completed. For example, task 723 is the oldest task in write queue 422 to begin the example, while task 727 is the oldest.

Next, task 728 is added to the queue. (It is assumed that task 723 was completed, although write queue 422 could be infinite in length and it is not necessary for one task to be removed in order for another to be added.) Task 728 is representative of an enqueued log message that needs to be persisted to a datastore. Write service 425 eventually works its way to task 728, at which point it is the next task to be completed. Write service 425 completes the task, which removes it from the queue.

In the meantime—or subsequent to completing task 728—task 733 has been placed in the queue. Task 733 is assumed to represent a new version of the log message enqueue with respect to task 728. In other words, task 733 represents a clone log messages to be persisted to a different datastore than original log. Write service 425 eventually works its way to task 733 too, at which point the asset data specified by the new log message is persisted to the appropriate database and task 733 is removed from the queue.

Various technical effects may be appreciated from the present discussion, including the ability for one organization to setup another organization with access to gateway data as-if the second organization was the primary entity associated with the gateway. In addition, providing gateway clones as contemplated herein mitigates or eliminates the need for complex and/or cumbersome filtering rules and capabilities, were the asset data to be stored in a single datastore. Privacy and security are also enhanced by improved gateway services disclosed herein by virtue of separating organizational access to asset data. For example, a sensitive portion of asset data produced by one gateway may be persisted to a source organization's datastore, but not to the datastore associated with a target organization. Thus, the sensitive portion of the data is largely—if not totally—inaccessible to the target organization.

Figure 8:
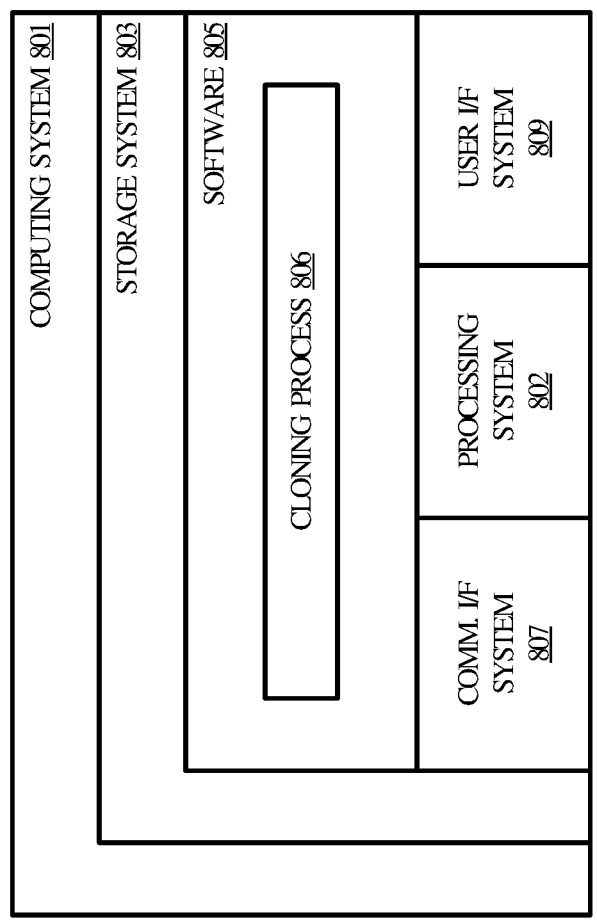
FIG. 8 illustrates a computing system suitable for implementing the various operational environments, architectures, processes, scenarios, and sequences discussed below with respect to the other Figures.

FIG. 8 illustrates computing device 801 that is representative of any system or collection of systems in which the various processes, programs, services, and scenarios disclosed herein may be implemented. Examples of computing device 801 include, but are not limited to, server computers, web servers, cloud computing platforms, and data center equipment, as well as any other type of physical or virtual server machine, container, and any variation or combination thereof. Examples may also include desktop and laptop computers, tablet computers, mobile computers, and wearable devices.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements cloning process 806, which is representative of the cloning processes discussed with respect to the preceding Figures, such as cloning process 200 and cloning process 500. When executed by processing system 802, software 805 directs processing system 802 to operate as described herein for at least the various processes, operational scenarios, and sequences discussed in the foregoing implementations. Computing device 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including cloning process 806) may be implemented in program instructions and among other functions may, when executed by processing system 802, direct processing system 802 to operate as described with respect to the various operational scenarios, sequences, and processes illustrated herein. For example, software 805 may include program instructions for implementing a cloning process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support asset gateway services. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, etc.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

In one implementation, cloning process 806, when executed by processing system 802, directs computing system 801 to at least: receive a log message comprising asset data captured by a gateway device onboard an asset, and a first identifier corresponding to a first representation of the gateway device associated with a first organization; persist, in a first datastore accessible by the first organization, at least a first portion of the asset data in association with the first representation of the gateway device; determine that at least a second representation of the gateway device associated with a second organization exists; and persist, in a second datastore accessible by the second organization, at least a second portion of the asset data in association with a second identifier corresponding to the second representation of the gateway device.

In the same or other implementations, to persist at least the first portion of the asset data in association with the first representation of the gateway device, cloning process directs computing system 801 to at least place the log message in a queue for a service that writes the first portion of the asset data to the first datastore; determine which portion of the asset data to persist in the first datastore based at least on the first identifier in the log message; write the first portion of the asset data to the first datastore; and remove the log message from the queue upon writing the first portion of the asset data to the first datastore.

In one or more of the implementations described immediately above and throughout, to persist at least the second portion of the asset data in association with the second representation of the gateway device, cloning process 806 directs computing system 801 to at least: generate a second version of the log message comprising the asset data and a second identifier corresponding to the second representation of the gateway device; place the second version of the log message in the queue for the service; determine which portion of the asset data to persist in the second datastore based at least on the second identifier in the second version of the log message; and write the second portion of the asset data to the second datastore.

In one or more of the implementations described immediately above and throughout, to determine the portion of the asset data to persist in the first datastore, based at least on the first identifier, cloning process 806 directs computing system 801 to at least: access configuration information for the first representation of the gateway device based on the first identifier, wherein the configuration information for the first representation of the gateway device specifies which portions of the asset data to persist in the first datastore.

In one or more of the implementations described immediately above and throughout, to determine the portion of the asset data to persist in the second datastore, based at least on the second identifier, cloning process 806 directs computing system 801 to at least: access configuration information for the second representation of the gateway device based on the second identifier, wherein the configuration information for the second representation of the gateway device specifies which portions of the asset data to persist in the second datastore.

In one or more of the implementations described immediately above and throughout, the second organization controls at least a portion of the configuration information for the first representation of the gateway device corresponding to the first portion of the asset data; the first organization owns the asset; and the second organization is subsidiary to the first organization.

In one or more of the implementations described immediately above and throughout, to determine that at least the second representation of the gateway device exists, cloning process 806 directs computing system 801 to at least: determine that other representations of the gateway device are enabled by the first organization; and identify the second representation of the gateway device based at least in part on the first identifier for the first representation of the gateway device.

In one or more of the implementations described immediately above and throughout, the first portion of the asset data and the second portion of the asset data comprise different portions of the asset data with respect to each other; and the first portion of the asset data comprises a subset of the second portion of the asset data.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

What is claimed is:

1. A computing device comprising:
   one or more computer readable storage media;
   one or more processors operatively coupled with the one or more computer readable storage media; and
   program instructions stored on the one or more computer readable storage media that, when executed by the one or more processors, direct the computing device to at least:
   generate a first representation of a gateway device onboard an asset and associate the first representation with a first organization;
   generate a second representation of the gateway device and associate the second representation with a second organization different from the first organization;
   receive a log message comprising asset data captured by the gateway device onboard the asset and a first identifier corresponding to the first representation of the gateway device associated with the first organization;
   place the log message in a queue for a service that writes a first portion of the asset data to a first datastore accessible by the first organization;
   generate a second version of the log message comprising the asset data and a second identifier corresponding to the second representation of the gateway device; and
   place the second version of the log message in the queue for a service that writes a second portion of the asset data to a second datastore accessible by the second organization, wherein the second portion is different from the first portion.

2. The computing device of claim 1, wherein the program instructions further direct the computing device to:
   display a first view of the asset data in a first dashboard associated with the first organization, wherein the first view is based on the first portion of the asset data.

3. The computing device of claim 2, wherein to generate the second version of the log message, the program instructions direct the computing device to generate a code unique to the second organization.

4. The computing device of claim 3, wherein the program instructions further direct the computing device to:
   receive the code from the second organization; and
   responsive to receiving the code, activate the second representation of the gateway device.

5. The computing device of claim 4, wherein to activate the second representation, the program instructions direct the computing device to display, on a second dashboard associated with the second organization, a second view based on the second portion of the asset data.

6. The computing device of claim 5, wherein to generate the second version of the log message, the program instructions further direct the computing device to generate an expiration date for the second representation of the gateway device.

7. The computing device of claim 1, wherein to generate the second version of the log message, the program instructions further direct the computing device to filter the asset data according to configuration information associated with the second organization.

8. The computing device of claim 7, wherein to filter the asset data, the program instructions further direct the computing device to exclude personally identifiable information.

9. A method of operating a computing system to clone asset data captured by a gateway device onboard an asset, the method comprising:
   generating a first representation of a gateway device and associating the first representation with a first organization;
   generating a second representation of the gateway device and associating the second representation with a second organization different from the first organization;
   receiving a log message comprising asset data captured by the gateway device onboard an asset and a first identifier corresponding to the first representation of the gateway device associated with the first organization;
   placing the log message in a queue for a service that writes a first portion of the asset data to a first datastore accessible by the first organization;
   generating a second version of the log message comprising the asset data and a second identifier corresponding to the second representation of the gateway device; and
   placing the second version of the log message in the queue for a service that writes a second portion of the asset data to a second datastore accessible by the second organization, wherein the second portion is different from the first portion.

10. The method of claim 9, further comprising displaying a first view of the asset data in a first dashboard associated with the first organization, wherein the first view is based on the first portion of the asset data.

11. The method of claim 10, wherein generating the second version of the log message comprises generating a code unique to the second organization.

12. The method of claim 11, further comprising:
receiving the code from the second organization; and
responsive to receiving the code, activating the second representation of the gateway device.

13. The method of claim 12, wherein activating the second representation of the gateway device comprises displaying, on a second dashboard associated with the second organization, a second view based on the second portion of the asset data.

14. The method of claim 13, wherein generating the second version of the log message further comprises generating an expiration date for the second representation of the gateway device.

15. The method of claim 9, wherein generating the second version of the log message comprises filtering the asset data according to configuration information associated with the second organization.

16. The method of claim 15, wherein filtering the asset data comprises excluding personally identifiable information.

17. A method of operating a computing device to clone device data in association with one or more representations of a gateway device, the method comprising:
subsequent to receiving a request from a primary organization, creating a subsidiary organization within a tenant environment of the primary organization;
generating a first representation of the gateway device and associating the first representation with the primary organization;
generating a second representation of the gateway device and associating the second representation with the subsidiary organization;
receiving a log message comprising asset data captured by a gateway device onboard an asset and a first identifier corresponding to a first representation of the gateway device associated with the primary organization;
persisting, in a datastore accessible by the primary organization, at least a first portion of the asset data in association with the first representation of the gateway device based at least on first configuration information for the first representation of the gateway device;
persisting, in a second datastore accessible by the subsidiary organization, at least a second portion of the asset data in association with the second representation of the gateway device based at least on second configuration information for the second representation of the gateway device; and
displaying a view of the asset data in a dashboard associated with the primary organization, wherein the view is based on the first portion of the asset data.

18. The method of claim 17, further comprising displaying a second view of the asset data in a second dashboard associated with the subsidiary organization, wherein the second view is based on the second portion of the asset data.

19. The method of claim 18, wherein the primary organization controls at least a portion of the second configuration information for the second representation of the gateway device corresponding to the second portion of the asset data.

20. The method of claim 18, wherein the subsidiary organization controls at least a portion of the first configuration information for the first representation of the gateway device corresponding to the first portion of the asset data.

\* \* \* \* \*